(12) United States Patent
Ichimura

(10) Patent No.: US 7,580,835 B2
(45) Date of Patent: Aug. 25, 2009

(54) QUESTION-ANSWERING METHOD, SYSTEM, AND PROGRAM FOR ANSWERING QUESTION INPUT BY SPEECH

(75) Inventor: Yumi Ichimura, Abiko (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 569 days.

(21) Appl. No.: 10/946,514

(22) Filed: Sep. 22, 2004

(65) Prior Publication Data
US 2005/0143999 A1 Jun. 30, 2005

(30) Foreign Application Priority Data
Dec. 25, 2003 (JP) ............................. 2003-428503

(51) Int. Cl.
*G10L 15/26* (2006.01)
(52) U.S. Cl. ..................................... 704/235
(58) Field of Classification Search ................. 704/235
See application file for complete search history.

(56) References Cited

U.S. PATENT DOCUMENTS 6,829,603 B1 * 12/2004 Wolf et al. ..................... 707/5
6,957,213 B1 * 10/2005 Yuret ............................... 707/4
2001/0039493 A1 * 11/2001 Pustejovsky et al. ........ 704/235
2002/0116176 A1 * 8/2002 Tsourikov et al. .............. 704/9
2002/0128818 A1 * 9/2002 Ho et al. ......................... 704/9

FOREIGN PATENT DOCUMENTS

| JP | 59-121098 | 7/1984 |
| JP | 11-184492 | 7/1999 |
| JP | 2002-132811 | 5/2002 |
| JP | 2002-221984 | 8/2002 |
| JP | 2004-302660 | 10/2004 |
| JP | 2005-63185 | 3/2005 |

* cited by examiner

*Primary Examiner*—David R Hudspeth
*Assistant Examiner*—Jakieda R Jackson
(74) *Attorney, Agent, or Firm*—Finnegan, Henderson, Farabow, Garrett & Dunner, L.L.P.

(57) ABSTRACT

Disclosed is a question answering method for answering a question by using a text database storing text data in conjunction with a speech database storing speech data. In this method, a speech signal of the question is received. A speech recognition for the speech signal is performed to obtain a speech recognition result including a recognition accuracy evaluation value. One of the text database and the speech database is selected by comparing the recognition accuracy evaluation value with a threshold value. Then, the selected database is searched for a search result. An answer to the question is generated based on the search result.

18 Claims, 5 Drawing Sheets

Source data display window

Answer 1 :
Registration date : July 3, 2002
Registrant : YAMADA
The consultation hours of hospital A are 9 a.m. to 3 p.m.

[Delete] 501    [Return to previous window] 502

FIG. 5

Recognition result correction window

What are the consultation hours of hospital A

Hospital A         [×]
Beauty parlor A    [ ]
Hospital B         [ ]

Consultation
Volume             [×]   } 601

Time
Unpublished        [×]
                   [ ]

[Next recognition result] ~602    [Correction execution] ~603

FIG. 6

QUESTION-ANSWERING METHOD, SYSTEM, AND PROGRAM FOR ANSWERING QUESTION INPUT BY SPEECH

CROSS-REFERENCE TO RELATED APPLICATIONS

This application is based upon and claims the benefit of priority from prior Japanese Patent Application No. 2003-428503, filed Dec. 25, 2003, the entire contents of which are incorporated herein by reference.

BACKGROUND OF THE INVENTION

1. Field of the Invention

The present invention relates to a question answering method, system, and program for answering a question which a user inputs by speech.

2. Description of the Related Art

A document retrieval technique which retrieves and presents a document matching a user's query is in widespread use.

Although document retrieval can satisfy a query such as "Tell me about hospital A", it may not directly answer a question such as "What are the consultation hours of hospital A?" or "Where is hospital A?". Document retrieval merely outputs a whole document or a passage in a document, but does not answer a question. A user as a questioner has to find an answer from the output result by himself or herself.

On the other hand, as a system which directly answers questions, a question answering system as described in, e.g., Jpn. Pat. Appln. KOKAI Publication No. 2002-132811 is known.

Demand has arisen for providing a speech-based, question answering system including a knowledge source for obtaining answers to questions. A practical example is a question answering system by which a question can be input by speech from a speech input device such as a microphone or cell phone, and an answer to the question can be generated and output by searching a speech database constructed on the basis of, e.g., voice memos stored in a recording device.

The conventional question answering systems exclusively use text databases, and retrieve answers to questions expressed by texts. Some question answering systems allow inputting of questions by speech via speech input devices, but their databases to be searched are text databases. When a question is given by speech, this question speech data is converted into a text by using a speech recognition system, and then an answer is retrieved. It is possible to directly output the answer as a text, or output the text as speech from a speech synthesizing device.

The present speech recognition technique may not convert speech data into text data at an accuracy of 100%. Therefore, it is highly likely that no right answer can be obtained from the conventional system if a speech recognition is wrong.

For example, when a question "What are the consultation hours of hospital A?" is input by speech, a speech recognition unit may correctly recognize words such as "hospital A", "consultation", and "hours". These words are equivalent to query terms.

A specific proper noun such as "hospital A" is not generally registered in a speech recognition dictionary, so the possibility of wrong speech recognition of this portion is high. On the other hand, general nouns such as "consultation" and "hours" are generally highly likely registered in the dictionary, so speech recognition of these nouns is probably possible at high accuracy.

If the speech recognition accuracy is high, highly accurate answers can be obtained by retrieval of a text database. However, if the speech recognition accuracy is low, it is preferable to search a speech database, instead of the text database, by directly using speech feature parameter time-series data obtained from a speech waveform, because an answer may be obtained even if it may not be obtained by retrieval of the text database. High retrieval accuracy can be expected especially when a speech database, in which speech data input by a user himself or herself is registered, is to be retrieved by a question input by speech of the user himself or herself.

BRIEF SUMMARY OF THE INVENTION

According to an aspect of the present invention, there is provided a question answering method for answering a question by using a text database storing text data in conjunction with a speech database storing speech data. In this method, a speech signal of the question is received. A speech recognition for the speech signal is performed to obtain a speech recognition result including a recognition accuracy value. One of the text database and the speech database is selected by comparing the recognition accuracy evaluation value with a threshold value. Then, the selected database is searched for a search result. An answer to the question is generated based on the search result.

BRIEF DESCRIPTION OF THE SEVERAL VIEWS OF THE DRAWING

FIG. 5 is a view showing an example of a source data display window related to the processing of the update controller; and FIG. 6 is a view showing an example of a recognition result correction window related to the processing of the update controller.

DETAILED DESCRIPTION OF THE INVENTION

Figure 1:
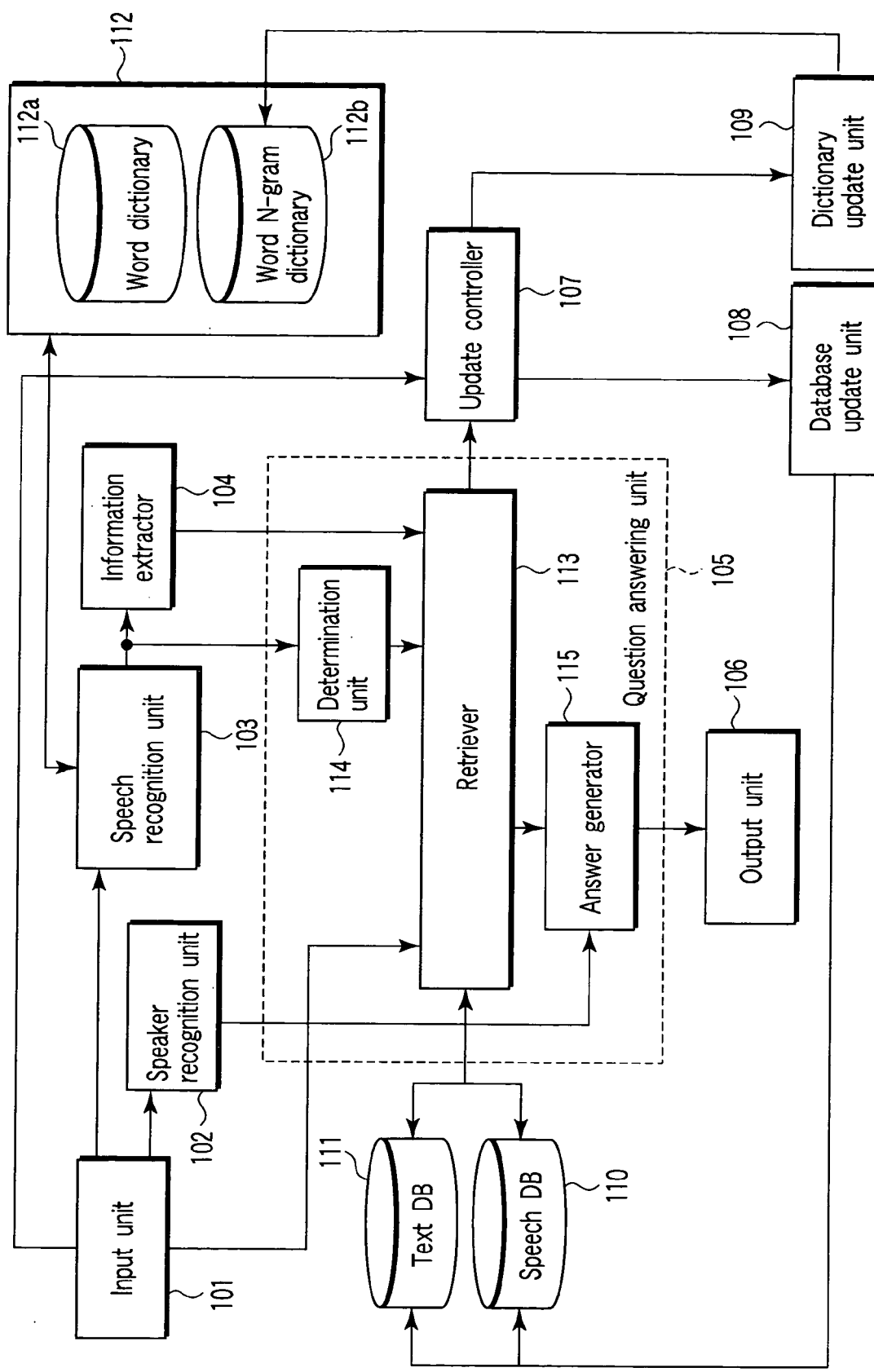
FIG. 1 is a block diagram showing a question answering system according to an embodiment of the present invention.

In FIG. 1, a block diagram of a question answering system in accordance with an embodiment of the present invention is shown. The question answering system comprises an input unit 101, speaker recognition unit 102, speech recognition unit 103, information extractor 104, question answering unit 105, output unit 106, update controller 107, database update unit 108, dictionary update unit 109, text database 110, speech database 111, and recognition dictionary 112.

The input unit 101 includes, but not limited to, a microphone, keyboard, input pen, or mouse. The output unit 106 includes, but not limited to, a display or loudspeaker. This system can be implemented by software executable by a computer including these input/output units. In this computer, the speaker recognition unit 102, speech recognition unit 103, information extractor 104, question answering unit 105, update controller 107, database update unit 108, and dictionary update unit 109 include modules of a computer program. The question answering unit 105 in turn includes a retriever 113, determination unit 114, and an answer generator 115.

The text database 110, speech database 111, and recognition dictionary 112 may be recorded on a recording medium such as a magnetic disk device. The recognition dictionary 112 includes a word dictionary 112a and word N-gram dictionary 112b. The word dictionary 112a describes the pronunciation (expressed by phonemes) of a word to be recognized. The word N-gram dictionary 112b describes the connection between words by the value of probability.

The question answering system according to this embodiment is different from any conventional question answering system in that the question answering unit 105 uses in conjunction with the text database 110 and speech database 111. The question answering system according to this embodiment is also different from any conventional question answering system in that the system includes the update controller 107, database update unit 108, and dictionary update unit 109 in order to maintain the databases and recognition dictionaries.

First, the flow of the overall processing of the question answering system according to this embodiment will be described below with reference to FIG. 1. Then, the procedure of a question answering process will be explained with reference to FIG. 2.

(Flow of Overall Processing) First, data forming the knowledge databases is registered as follows. A user inputs data to be registered by speech via the input unit 101. When a question is input, a speech signal of this question is output from the input unit 101 to the speaker recognition unit 102. The speaker recognition unit 102 collates speech data based on this speech signal with preregistered user information, thereby recognizing the data registrant. The speaker recognition technique is well known and described in, e.g., Jpn. Pat. Appln. KOKAI Publication No. 11-184492. When the user is recognized by this speaker recognition, the speech data is supplied to the speech recognition unit 103. The speech recognition unit 103 performs speech recognition for the speech data by using the recognition dictionary 112, thereby converting the speech data into text data. The speech data as the conversion source is stored in the speech database 111, and the text data obtained by the conversion is stored in the text database 110. The speech database 111 also stores a speech feature parameter time series obtained as an intermediate outcome of the speech recognition performed by the speech recognition unit 103. Note that the flow of practical processing of speech recognition will be explained later. Also, the registrant information recognized by the speaker recognition unit 102 is stored in the two databases 110 and 111. Then, the text data is supplied to the information extractor 104. The information extractor 104 extracts, from the text data, information such as time information and person's name information in accordance with the types of information by using the known information extraction technique, and outputs the result to the text database 110. Note that it is also possible to register data in the knowledge database (the speech database 111 or text database 110) without performing any speaker recognition.

When the knowledge databases are thus constructed, questions from the user can be accepted. First, the user inputs a question by speech via the input unit 101. When the question is input, a speech signal of the question is output from the input unit 101 to the speaker recognition unit 102. The speaker recognition unit 102 collates speech data of the question based on the speech signal with the preregistered user information, thereby recognizing the questioner. The speech data of the question is then supplied to the speech recognition unit 103. The speech recognition unit 103 converts the speech data of the question into text data by using the recognition dictionary 112.

After that, the question answering unit 105 is activated. The question answering unit 105 evaluates the result of speech recognition of the speech data of the question. In accordance with the evaluation result, the question answering unit 105 searches the speech database 111 or text database 110 and generates an answer to be presented to the user. The contents of the generated answer are obtained by taking into account the security of information disclosure corresponding to the user information based on the result of recognition by the speaker recognition unit 102. The answer generated by the question answering unit 105 is presented as speech or a displayed text to the user via the output unit 106.

The question answering system according to this embodiment activates the update controller 107 at an appropriate timing. If source data corresponding to the basis of an answer to an input question is unnecessary in respect of maintenance, the update controller 107 asks the user whether to delete the data via the user interface. When the user returns an answer via the input unit 101, the database update unit 108 is activated in accordance with the instruction of the answer. Of the data stored in the speech database 111 and text database 110, the database update unit 108 deletes data corresponding to the instruction. The update controller 107 also asks the user whether the answer to the input question is right. If the user notifies this system that the answer is wrong via the input unit 101, the update controller 107 presents the speech recognition result of the speech data corresponding to the basis of the answer to the input question, and the speech recognition result of the question. When the user designates correction information for the speech recognition result via the input unit 101, the database update unit 108 and dictionary update unit 109 are activated in accordance with this designation. Of the data stored in the text database 110, the database update unit 108 corrects the corresponding data in accordance with the correction information. The dictionary update unit 109 updates the dictionary information stored in the word N-gram dictionary 112b, in accordance with the correction information supplied from the update controller 107.

Figure 2:
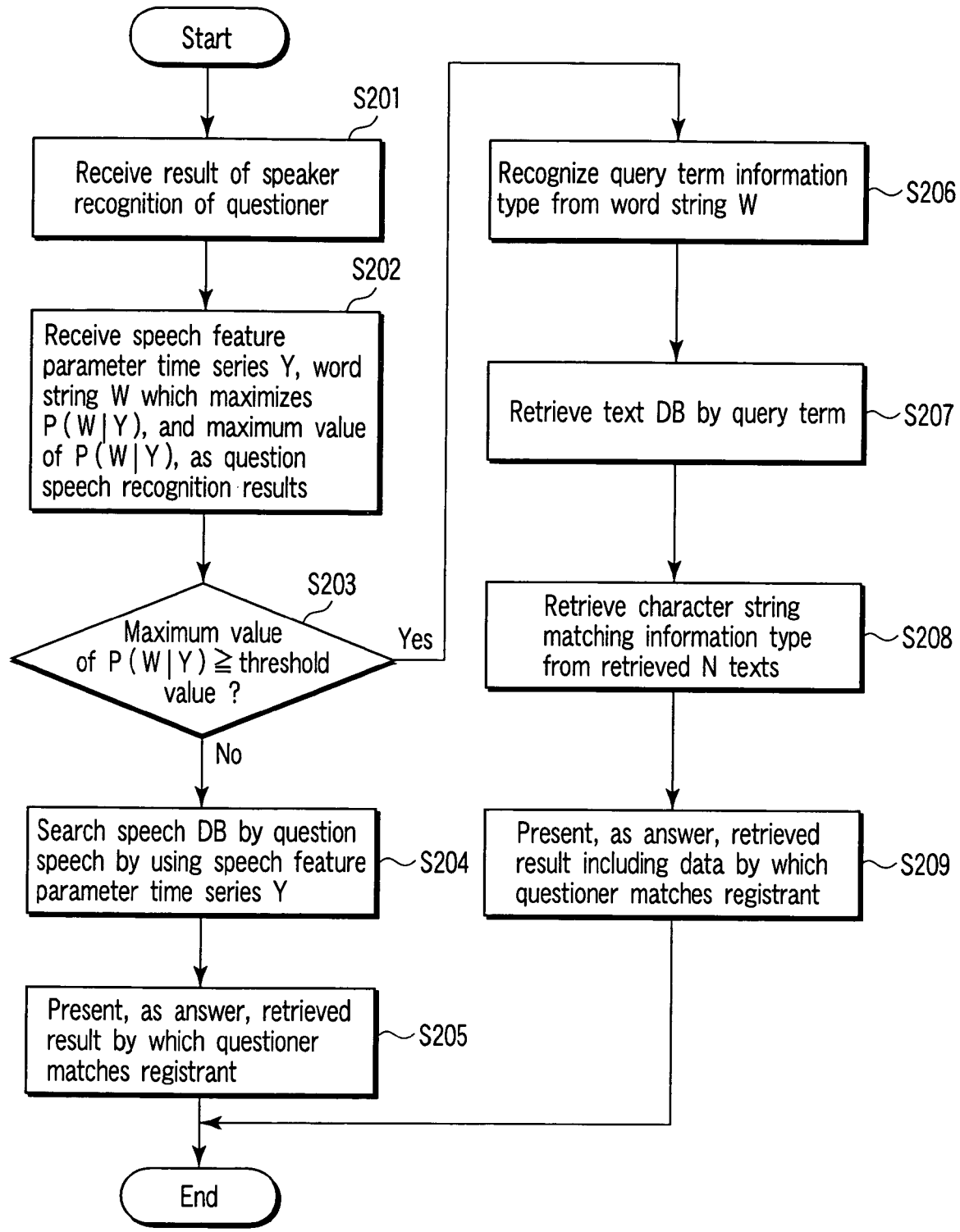
FIG. 2 is a flowchart showing an example of the procedure of a question answering unit.

(Details of Procedure of Question Answering Process) FIG. 2 is a flowchart showing an example of the procedure of the question answering unit 105. First, the question answering unit 105 receives user information of a questioner recognized by the speaker recognition unit 102 (step S201). Then, the question answering unit 105 receives, as the results of speech recognition performed for question speech X by the speech recognition unit 103, a speech feature parameter time series Y, a word string W which maximizes a posteriori probability $P(W|Y)$, and a maximum value of the posteriori probability $P(W|Y)$ (step S202).

Figure 3:
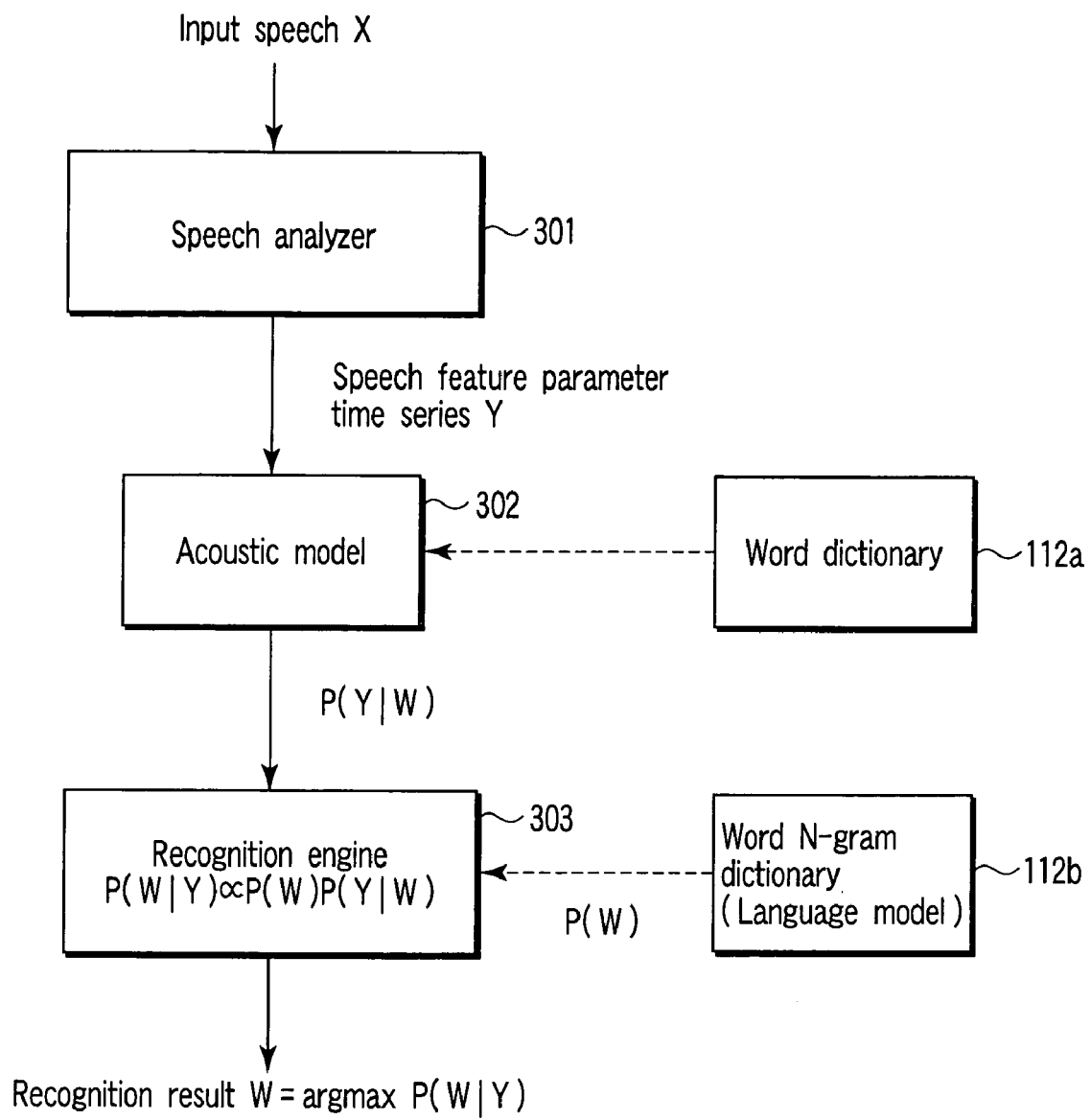
FIG. 3 is a flowchart showing an example of the procedure of a speech recognition unit.

(Flow of Practical Processing of Speech Recognition) FIG. 3 is a flowchart showing an example of the procedure of the speech recognition unit. When a speech waveform signal X is input, a speech analyzer 301 analyzes the speech waveform signal X and converts it into a multidimensional speech feature amount parameter time series Y called a speech feature parameter. In this speech analysis, noise removal and distortion correction are also performed. Speech recognition based on a statistical model (acoustic model 302) can be formalized as a problem for obtaining the word string W which maximizes the posteriori probability $P(W|Y)$ for the speech feature parameter time series Y. The probability $P(W|Y)$ can be deformed into $$P(W|Y)=P(W)P(Y|W)/P(Y) \tag{1}$$

by Bayes' theorem.

In equation (1), $P(Y)$ as a denominator is a term irrelevant to the word string W. To maximize $P(W|Y)$, therefore, it is necessary to obtain the word string W which maximizes P(W) P(Y|W) as a numerator. Note that P(Y|W) is calculated as the probability of an acoustic model, and P(W) is calculated as the probability of a language model.

The acoustic model 302 can be expressed by a statistical model having the distribution of an acoustic feature amount pattern whose unit is a phoneme, e.g., a three-state hidden Markov model. This model can be estimated from a feature amount extracted by speech analysis of a speech corpus.

On the other hand, the language model can be expressed by a probability model based on N-gram which is a word chain statistical value, e.g., a word trigram by which N=3. This can be estimated from data obtained by dividing a text corpus into words by morphological analysis, and giving the reading to the words. For example, a word chain statistical value is estimated such that the conditional probability that a postpositional word "か (ka)" connects to a verb "いる (iru)" and another postpositional word "も (mo)" connects to "か (ka)" is 0.011, and this statistical value is stored in the word N-gram dictionary 112b.

A recognition engine 303 outputs the speech feature parameter time series Y, the word string W which maximizes the posteriori probability P(W|Y), and the maximum value of the posteriori probability P(W|Y). The maximum value of the posteriori probability P(W|Y) is used as a speech recognition accuracy evaluation value. Note that methods of realizing a speech recognition are described in, e.g., Jpn. Pat. Appln. KOKAI Publication Nos. 11-184492 and 59-121098.

Referring back to FIG. 2, the procedure of the question answering process will be explained in detail again. In step S203, whether the maximum value of the posteriori probability P(W|Y) is a threshold value or more is determined. If the maximum value of the posteriori probability P(W|Y), i.e., the speech recognition accuracy evaluation value is equal to or greater than the threshold value, the determination unit 114 selects the text database as a database to be searched, and the flow advances to step S206. If the speech recognition accuracy evaluation value is less than the threshold value, the determination unit 114 selects the speech database as a database to be searched, and the flow advances to step S204.

In step S204, the retriever 113 searches the speech database 111 by the question speech by using the speech feature parameter time series Y, without using the speech recognition result. If a search result by which the questioner matches the registrant is obtained, this result is presented as an answer (step S205). Retrieval of time-series data can be performed as follows. For example, letting T be the length of the speech feature parameter time series Y of the question speech, speech feature parameter time series Z(i) having the length T is extracted from each speech data in the speech database 111, the distance between Y and Z(i) is calculated, and speech data including Z(i) which minimizes the distance between Y and Z(i) is used as a search result, or speech data which minimizes the average distance between Y and Z(i) is used as a search result. Various algorithms for retrieving time-series data are proposed, so these algorithms may also be appropriately used. For example, it is possible to use a speech retrieval method described in Jpn. Pat. Appln. KOKAI Publication No. 2002-221984.

In step S206, the information extractor 104 recognizes query terms and an information type from the word string W obtained as a speech recognition result by the speech recognition unit 103. For example, when a question "What are the consultation hours of hospital A?" is asked, the information extractor 104 recognizes "hospital A", "consultation", and "hours" as query terms, and "TIME" as the information type of an answer. Note that a process of recognizing an information type to be answered is described in, e.g., Japanese Patent Application Nos. 2003-92508 and 2003-293178 subsequently published as Japanese Patent Application KOKAI Publication Nos. 2004-302660 and 2005-63185, respectively.

Subsequently, the retriever 113 searches the text database 110 by text retrieval using the query terms (step S207). Text retrieval is a well-known technique, so a detailed explanation thereof will be omitted. In addition, the retriever 113 retrieves N (e.g., N=20) texts obtained by this text retrieval, for character strings matching the information type extracted by the information extractor 104 (step S208). Of the character strings thus found, the answer generator 115 generates, as an answer, a character string included in data by which the questioner and the registrant match. The generated answer is output to the output unit 106 (step S209). After that, the processing of the question answering unit 105 is completed.

Note that steps S201, S205, and 209 are additional steps, so any of these steps may also be omitted depending on the form of practice. For example, if speaker recognition in step S201 is omitted, a result obtained in step S204 or S208 is directly presented as an answer regardless of the result of recognition of a questioner (user).

In step S205, it is also possible to include data by which the questioner and the registrant do not match, and preferentially output, as an answer, data by which the questioner and the registrant match, instead of exclusively outputting, as an answer, data by which the questioner and the registrant match. Alternatively, it is possible to allow a registrant to set access permission when he or she registers data, and exclude, from an answer, data by which a questioner has no access permission.

Likewise, in step S209, it is also possible to include, in an answer, a character string included in text data by which the questioner and the registrant do not match, and preferentially output, as an answer, a character string included in text data by which the questioner and the registrant match, instead of exclusively outputting, as an answer, a character string included in text data by which the questioner and the registrant match. Alternatively, it is possible to allow a registrant to set access permission when he or she registers text data, and exclude, from an answer, a character string included in text data by which a questioner has no access permission.

In this embodiment as described above, it is possible to provide a question answering system so designed that the question answering unit 104 uses in conjunction with the text database 110 and speech database 111. More specifically, in accordance with the quality of the result of speech recognition of a question, i.e., the speech recognition accuracy evaluation value in this embodiment, the question answering unit 104 can appropriately selectively search the text database 110 or speech database 111, and reliably obtain an answer at high accuracy.

(Update of Databases and Recognition Dictionaries)

Figure 4:
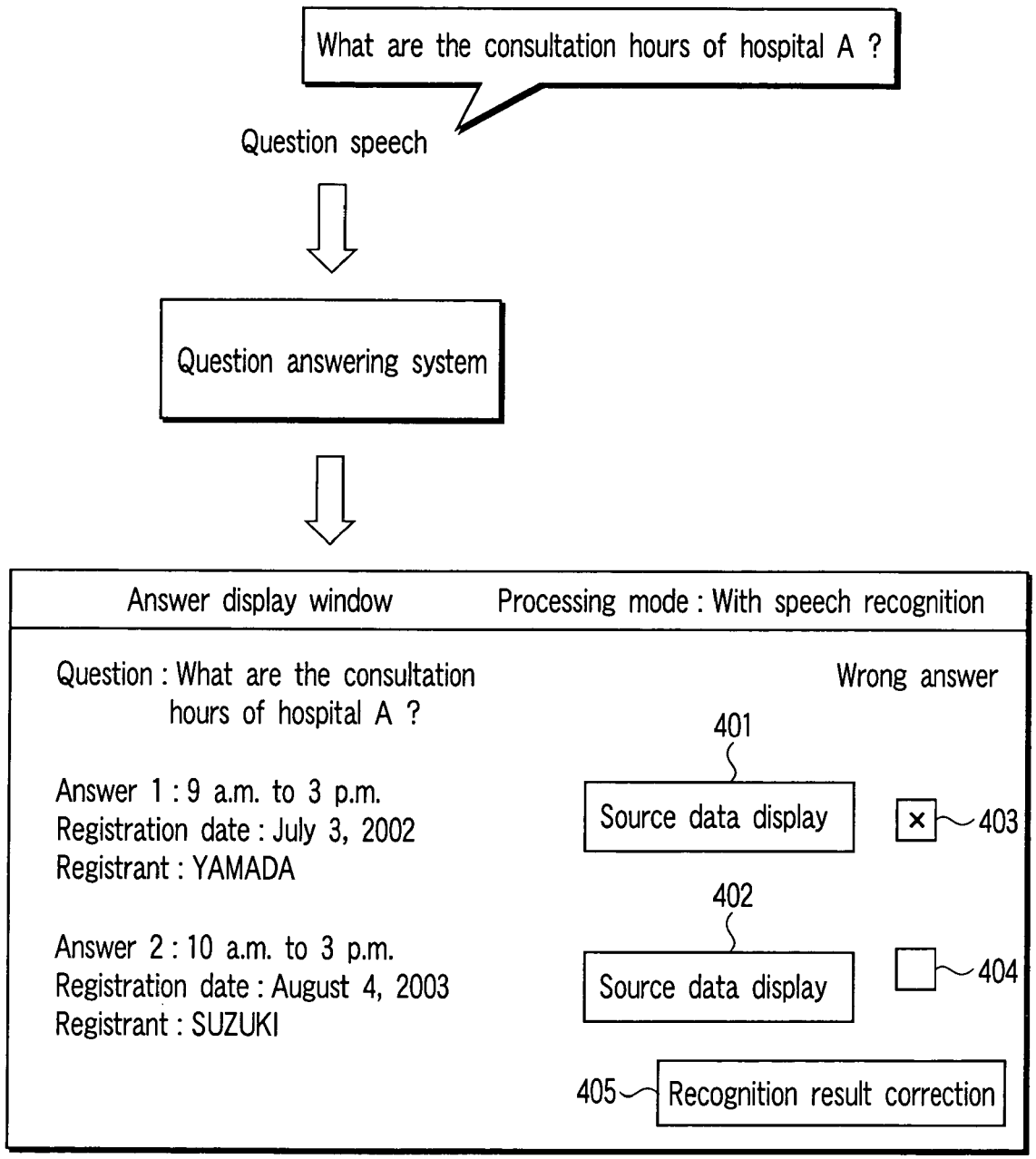
FIG. 4 is a view showing an example of an answer display window related to the processing of an update controller.

Update of the databases and recognition dictionaries performed under the control of the update controller 107 will be described below. An output from the question answering system in processing related to the user interface can be generated as speech from a loudspeaker or displayed on a display device. In this embodiment, visual display using a display device will be explained as an example. The update controller 107 is connected to the input unit 101 and question answering unit 105, and controls the database update unit 108 and dictionary update unit 109. Several windows constructing a GUI (Graphical User Interface) shown in FIGS. 4 to 6 are related to the update controller 107. FIG. 4 is a view showing an example of an answer display window. FIG. 5 is a view showing an example of a source data display window. FIG. 6 is a view showing an example of a recognition result correction window.

FIG. 4 shows an example of an answer display window which the question answering system of this embodiment displays when question speech "What are the consultation hours of hospital A?" is input. The display device displays a processing mode, the result of recognition of the question, the number of an answer, an answer character string, and the registration date and registrant of source data corresponding to the basis of the answer to the input question. The processing mode indicates whether the text database 110 is retrieved by using the speech recognition result, or the speech database 111 is retrieved without using the speech recognition result.

On the side of each answer, there are arranged a source data display button (401 or 402) and a check box (403 or 404) for indicating a wrong answer. When a user clicks (presses) the source data display button 401 or 402 by a mouse or the like, information of source data is displayed on the display device as shown in FIG. 5. If the user wants to delete this source data because, e.g., the data itself is wrong or the information is old, he or she just need click a delete button 501 by the mouse or the like. When delete is designated via the delete button 501, the database update unit 108 deletes the corresponding data from the text database 110 and speech database 111. If the user does not want to delete the source data, he or she clicks a button 502 for returning to the previous window by the mouse or the like, thereby restoring the display window shown in FIG. 4.

The user who knows that answer 1 is a wrong answer on the basis of the display shown in FIG. 4 checks the check box 403, and clicks a recognition result correct button 405. Consequently, the display device displays a recognition result correction window as shown in FIG. 6.

Through this recognition result correction window shown in FIG. 6, the user can correct the result of speech recognition by the speech recognition unit 103. Objects to be corrected are the recognition result of the question, and the recognition result of the source data corresponding to the basis of an answer whose wrong answer check box is checked. If a larger number of recognition results are present, each next result is displayed when a next recognition result button 602 is clicked. When the user first checks a check box 601 positioned beside the recognition result button 602 by the mouse or the like in order to select a wrong recognition result and then clicks a correction execute button 603 by the mouse or the like, the database update unit 108 and dictionary update unit 109 are activated. That is, on the basis of the contents of check in the check box 601, the database update unit 108 corrects the corresponding recognition result stored in the text database 110. Likewise, on the bass of the contents of check in the check box 601, the dictionary update unit 109 corrects the dictionary information stored in the word N-gram dictionary 112b. That is, the word N-gram dictionary 112b describes three chained words and their chain probability as dictionary information. For example, the dictionary information is corrected by reducing, at a predetermined ratio, the value of the chain probability of three words corresponding to a wrong recognition result, or by increasing, at a predetermined ratio, the value of the chain probability of three words corresponding to a right recognition result.

Although data is displayed on the display device in the above embodiment, it is also possible to output speech from a loudspeaker. In this case, processing can be advanced in accordance with an interactive operation based on speech. That is, when the user asks a question by speech, the question answering system outputs answers, such as "There are two answers" and "The first answer, from 9 a.m. to 3 p.m. The second answer, from 10 a.m. to 3 p.m.", by speech through the loudspeaker. Subsequently, the question answering system returns a question "Do you want to correct source data?" If the user answers "YES" to the question by speech, the question answering system responds by, e.g., "The first source data will be played back. The registration date, Jul. 3, 2002, the registrant, Yamada, the consultation hours of hospital A are from 9 a.m. to 3 p.m." and "Do you want to delete this information?" from the loudspeaker. If the user answers "YES" to the question by speech, this is equivalent to clicking the delete button 501 displayed on the screen as described above, so the same result is obtained.

The embodiment of the present invention described above processes questions asked in Japanese, but the present invention does not limit the natural language of questions to any specific language. For example, to process questions in English, it is necessary to apply the known techniques, such as part-of-speech tagging and stemming, instead of morphological analysis of Japanese, in order to analyze questions asked in English.

In the above embodiment of the present invention, even if the accuracy of speech recognition is low, it is possible to provide a high-accuracy, reliable question answering system having a wide coverage, because the speech database and text database forming the knowledge source are used in combination (selectively used).

Any conventional question answering system is designed by assuming that the system is used to find answers from documents, such as newspaper articles, WWW (World Wide Web) documents, and office documents, which admit disclosure to any third party; no conventional question answering system is assumed to use personal information as a knowledge source. For example, when personal memo information is stored in a database, it is necessary to recognize the registrant and searcher of data, and control an information disclosure method such that information is not indiscriminately disclosed to any third person, or information registered by a user himself or herself is preferentially disclosed. However, no conventional question answering system has any practical means for controlling an information disclosure method like this.

By contrast, this embodiment includes a means for controlling the information disclosure method by recognizing the registrant and searcher of data. This makes it possible to provide a question answering system having security which does not indiscriminately disclose information to any unintended third party. It is also possible to provide a question answering system having high adaptability to a user, by preferentially displaying answers based on information registered by the user himself or herself.

If data is kept stored unconditionally, old data naturally remains without being erased. Many documents such as newspaper articles, WWW documents, and office documents have universality, so it is not necessarily possible to regard all old documents as unnecessary. In contrast, personal memo information is presumably updated frequently, so mixing of old information and new information may lead to confusion. No conventional question answering system has any practical means for deleting such old information. For example, assume that data "The consultation hours of hospital A are 9 a.m. to 3 p.m." is registered at one time. Assume also that the consultation hours are changed after that, and new data "The consultation hours of hospital A are 10 a.m. to 3 p.m." is registered. If a question "What are the consultation hours of hospital A?" is asked in this state, two answers "From 9 a.m. to 3 p.m." and "From 10 a.m. to 3 p.m." are presented, and this puzzles the questioner.

In this embodiment, however, if a plurality of answers is presented with respect to one question, source data (also called original data) which is equivalent to the basis of each answer and the registration date and registrant of the source data can be presented as useful information for finding a right answer. It is also possible to ask a user whether to delete source data, and delete unnecessary data in accordance with a request from the user. This makes it possible to provide a question answering system which facilitates update of databases and improves the maintainability.

If an answer to a question is wrong, this may be caused by a speech recognition error. For example, if "hospital A" is recognized as "beauty parlor A" or "hospital B" by a speech recognition error, noting here that "hospital" and "beauty parlor" have similar pronunciation in Japanese, no right answer can be returned to the question. In this embodiment, if an answer to a question is wrong, data equivalent to the basis of the answer and the result of speech recognition of the question are presented to the user to accept correction. In addition, since the results of the correction can be reflected on the speech recognition dictionary, search can be accurately performed after that.

Furthermore, in this embodiment, a user can confirm the process by which an answer to an input question is obtained. Therefore, a question answering system adapted to the user can be constructed.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. A question answering method for answering a question by using a text database storing text data in conjunction with a speech database storing speech data, comprising:
    receiving a speech signal of the question;
    performing a speech recognition for the speech signal to obtain a speech recognition result including a recognition accuracy evaluation value;
    selecting one of the text database and the speech database by comparing the recognition accuracy evaluation value with a threshold value;
    searching the selected database for a search result;
    and generating an answer to the question based on the search result;
    wherein the speech recognition result includes text data, and wherein: if the recognition accuracy evaluation value is not less than the threshold value, then the text database is selected and searched by using the text data as a query term; and if the recognition accuracy evaluation value is less than the threshold value, then the speech database is selected and searched based on information received from the speech signal.

2. The method according to claim 1, further comprising recognizing a questioner from the speech signal, and wherein the answer is generated by using a part of the search result corresponding to the recognized questioner in preference to another part of the search result corresponding to a person other than the questioner.

3. The method according to claim 1, further comprising recognizing a questioner from the speech signal, and wherein the answer is generated by using an authorized part of the search result to which the recognized questioner has access permission.

4. The method according to claim 1, further comprising:
    displaying a plurality of text data or a plurality of speech data obtained as the search result from the text database or speech database; and deleting, from the text database or speech database, the same data as one of the plurality of displayed text data or speech data in accordance with a user's request.

5. The method according to claim 1, further comprising:
    displaying a correction window which represents the speech recognition result;
    and correcting the text database in accordance with a user's correction instruction in the correction window.

6. The method according to claim 1, further comprising:
    displaying a correction window which represents the speech recognition result;
    and correcting a speech recognition dictionary for use in speech recognition in accordance with a user's correction instruction in the correction window.

7. A system for answering to a question, comprising a computer coupled to a text database storing text data and a speech database storing speech data, the computer including question answering software which configures the computer to:
    receive a speech signal of the question;
    perform a speech recognition for the speech signal to obtain a speech recognition result including a recognition accuracy evaluation value;
    select one of the text database and the speech database by comparing the recognition accuracy evaluation value with a threshold value;
    search the selected database for a search result; and
    generate an answer to the question based on the search result;
    wherein the speech recognition result includes text data, and wherein the question answering software further configures the computer to:
        select and search the text database, using the text data as a query term, if the recognition accuracy evaluation value is not less than the threshold value; and
        select and search the speech database based on information received from the speech signal, if the recognition accuracy evaluation value is less than the threshold value.

8. The system according to claim 7, wherein the question answering software further configures the computer to:
    recognize a questioner from the speech signal; and
    generate the answer by using a part of the search result corresponding to the recognized questioner in preference to another part of the search result corresponding to a person other than the questioner.

9. A system according to claim 7, wherein the question answering software further configures the computer to:
    recognize a questioner from the speech signal; and
    generate the answer by using an authorized part of the search result to which the recognized questioner has access permission.

10. The system according to claim 7, further comprising a display device coupled to the computer, and wherein the question answering software further configures the computer to:
    display, on the display device, a plurality of text data or a plurality of speech data obtained as the search result from the text database or speech database; and delete, from the text database or speech database, the same data as one of the plurality of displayed text data or speech data in accordance with a user's request.

11. The system according to claim 7, further comprising a display device coupled to the computer, and wherein the question answering software further configures the computer to:
displaying, on the display device, a correction window which represents the speech recognition result; and
correct the text database in accordance with a user's correction instruction in the correction window.

12. The system according to claim 7, further comprising a display device coupled to the computer, and wherein the question answering software further configures the computer to:
display, on the display device, a correction window which represents the speech recognition result; and
correct a speech recognition dictionary for use in speech recognition in accordance with a user's correction instruction in the correction window.

13. A computer-readable recording medium encoding a program executed by a computer for answering a question by using a text database storing text data in conjunction with a speech database storing speech data, the program comprising:
means for instructing a computer to receive a speech signal of the question;
means for instructing the computer to perform a speech recognition for the speech signal to obtain a speech recognition result including a recognition accuracy evaluation value;
means for instructing the computer to select one of the text database and the speech database by comparing the recognition accuracy evaluation value with a threshold value;
means for instructing the computer to search the selected database for a search result; and
means for instructing the computer to generate an answer to the question based on the search result;
wherein the speech recognition result includes text data, and
wherein:
if the recognition accuracy evaluation value is not less than the threshold value, then the text database is selected and searched by using the text data as a query term; and
if the recognition accuracy evaluation value is less than the threshold value, then the speech database is selected and searched based on information received from the speech signal.

14. A computer-readable recording medium according to claim 13, the program further comprising means for instructing the computer to recognize a questioner from the speech signal, and wherein the answer is generated by using a part of the search result corresponding to the recognized questioner in preference to another part of the search result corresponding to a person other than the questioner.

15. A computer-readable recording medium according to claim 13, the program further comprising means for instructing the computer to recognize a questioner from the speech signal, and wherein the answer is generated by using an authorized part of the search result to which the recognized questioner has access permission.

16. A computer-readable recording medium according to claim 13, the program further comprising:
means for instructing the computer to display a plurality of text data or a plurality of speech data obtained as the search result from the text database or speech database on a display device; and
means for instructing the computer to delete, from the text database or speech database, the same data as one of the plurality of displayed text data or speech data in accordance with a user's request.

17. A computer-readable recording medium according to claim 13, the program further comprising:
means for instructing the computer to display a correction window which represents the speech recognition result on a display device; and
means for instructing the computer to correct the text database in accordance with a user's correction instruction in the correction window.

18. A computer-readable recording medium according to claim 13, the program further comprising:
means for instructing the computer to display a correction window which represents the speech recognition result on a display device; and
means for instructing the computer to correct a speech recognition dictionary for use in speech recognition in accordance with a user's correction instruction in the correction window.

* * * * *